United States Patent [19]

Towne

[11] 3,763,438

[45] Oct. 2, 1973

[54] FAST RECOVERY CIRCUIT FOR AC AMPLIFIER

[75] Inventor: Gary L. Towne, Littleton, Colo.

[73] Assignee: Honeywell Inc., Minneapolis, Minn.

[22] Filed: Sept. 23, 1971

[21] Appl. No.: 183,036

[52] U.S. Cl. .......... 330/185, 330/35, 330/3, 330/51, 330/147, 330/24

[51] Int. Cl. .......... H03f 1/00

[58] Field of Search .......... 330/51, 35, 185

[56] References Cited

UNITED STATES PATENTS

| | | | |
|---|---|---|---|
| 2,937,369 | 5/1960 | Newbold et al. | 340/177 |
| 3,569,603 | 3/1971 | Kerh | 84/1.19 |

*Primary Examiner*—Nathan Kaufman

*Attorney*—Arthur H. Swanson et al.

[57] ABSTRACT

A selector switch is operable to apply one of a plurality of input signals to a high impedance AC amplifier through a coupling network. A switching means is coupled to the selector switch for effecting the charging of a charge storage means during the elapsed time in switching from one position to another. The storage means being charged generates a charging signal which controls a switching device. The switching device is operative in response to the charging signal, to apply a relatively low impedance path across the input of the AC amplifier whereby to substantially reduce the response time of the AC amplifier.

4 Claims, 1 Drawing Figure

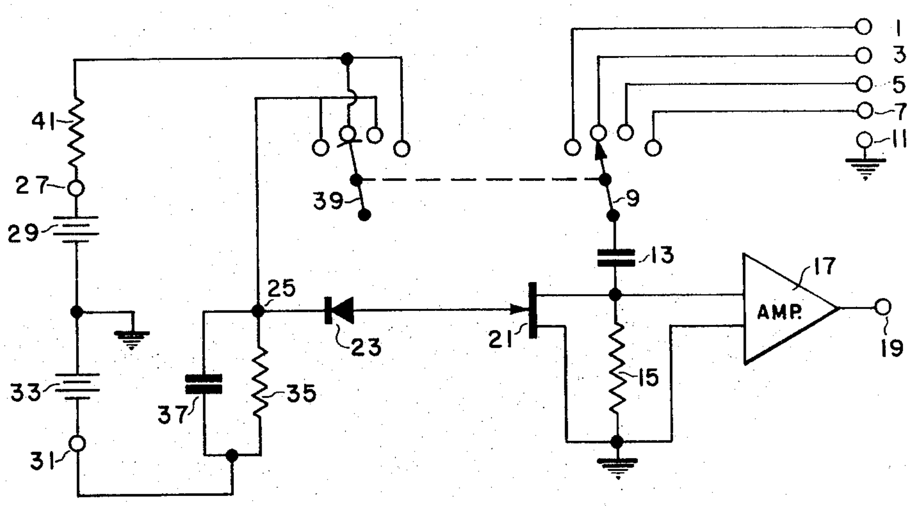
INVENTOR.
GARY L. TOWNE
BY Lockwood D. Burton
ATTORNEY

FAST RECOVERY CIRCUIT FOR AC AMPLIFIER

The present invention relates generally to AC amplifier circuits and more particularly to an improved control circuit for reducing the response time of an AC amplifier to a newly applied input signal.

In many monitoring or controlling systems, a source signal representative of changes occurring in the monitored or controlled system is available. That source signal may contain an AC and a DC component. In certain systems, the AC component represents the informational changes to be monitored while the DC component has no informational value. AC amplifiers used in such systems are usually preceeded by a coupling circuit comprising a capacitor in series with the amplifier to block the DC component, and a relatively high resistor connected across the input terminals of the AC amplifier to provide a maximum fidelity of AC component transfer. One disadvantage of such prior art apparatus becomes apparent when a plurality of source signals are to be applified in sequence as is the case when a selector switch is used to scan a plurality of input channels. With each cannel change, the AC amplifier will become saturated until the capacitor in the coupling circuit is charged to the level of the DC component present in the newly applied source signal. The delay thereby encountered before the AC amplifier is functional to amplify the AC component of the source signal, is known as the respose time of the circuit. That response time is proportional to the time constant of the combination of the resistor and the capacitor. Heretofore, one way to reduce the response time was to decrease the value of the resistor. That method however, necessarily reduced the fidelity of the coupling circuit. As a result fast response coupling circuits had the disadvantages of low fidelity and alternatively, high fidelity coupling circuits have the disadvantages of slow response time.

It is accordingly an object of the present invention to provide an amplifier circuit which obviates the disadvantages of the prior art apparatus.

It is another object of the present invention to provide an improved AC amplifier coupling circuit with a high fidelity of AC component transfer, and also fast amplifier response time.

It is a further object of the present invention to provide coupling circuit which is simple in construction and which requires a minimum of component parts.

In accomplishing these and other objects, there has been provided, in accordance with the present invention, an improved coupling circuit for use with an AC amplifier. The coupling circuit includes a series capacitor to block the DC component of each input signal, and a relatively high resistor connected across the AC amplifier to insure high fidelity of AC component transfer. As various input signals are applied to the coupling circuit, a relatively low impedance path is effected across the AC amplifier to substantially reduce the otherwise relatively long response time inherent to high fidelity AC amplifier circuits.

A better understanding of the present invention may be had from the following detailed description, when read in connection with the accompanying drawing, in which the single FIGURE is a schematic circuit diagram employing one embodiment of the present invention.

Referring to the drawing in detail, input terminals 1, 3, 5, and 7 are shown connected to distinct terminals of a first switching means or selector switch 9. A common terminal 11 is shown connected to a point of fixed reference potential or ground. The switch 9 is selectively operable to connect any one of the input channels or terminals 1, 3, 5, and 7 to a capacitor 13. A resistor 15 connects the other terminal of the capacitor 13 to ground. An AC amplifier 17 has its input terminals connected across the resistor 15 and provides an output signal at an amplifier output terminal 19. The circuit thus far described comprises a standard multiple input AC amplifier circuit.

A solid state switching device, as exemplified by a Field Effect Transistor (FET) 21, is shown with its source and drain terminals connected across the resistor 15. The control electrode of the FET 21 is connected to the anode terminal of a gate or diode 23, the cathode terminal of which is connected to a common point 25. A first source terminal 27 may be maintained at a positive voltage with respect to the common ground reference by a battery or other suitable energy means 29. A second source terminal 31 may be maintained at a negative potential with respect to the common ground reference by a battery or other suitable energy supply means 33. The second source terminal 31 is connected through a parallel combination of a resistor 35 and a capacitor 37 to the common point 25. A second switching means 39 is shown ganged to the selector switch 9 so that the second switching means moves one position for every one position movement of the first switching means or selector switch 9. The switching means 39 is shown with four contact positions, having first and third contact positions connected together and second and fourth contact positions connected together. The first and third contact positions are connected to the common point 25 while the second and fourth terminal positions of the switching means are connected through a resistor 41 to the source terminal 27.

In operation, the capacitor 13 and the resistor 15 comprise a coupling means for coupling the signals applied at the input terminals 1, 3, 5, and 7 selectively to the AC amplifier 17. In the circuit shown, four different input signals are applied between the input terminals 1, 3, 5, and 7, respectively, and the ground terminal 11. Each input signal ordinarily includes an AC component and a DC component. The resistor 15 is ordinarily of a high enough value to provide maximum fidelity in the transfer of the AC component of the particular input signal being applied from the input terminals to the AC amplifier 17. The capacitor 13 serves to block the unwanted DC component of the input signal. As the selector switch changes positions, a different DC component may appear which DC component difference will be immediately coupled through the capacitor 13 and appear across the resistor 15. The voltage thereafter appearing across the resistor 15 may be great enough to saturate the amplifier 17 until the capacitor 13 is able to charge or discharge to the steady value of the new DC component of the input signal. The time element involved while capacitor 13 is being charged or discharged is known as the response time of the circuit.

The present invention provides a circuit for reducing that response time to a minimum and yet maintaining high fidelity AC coupling between the input signal and the amplifier 17. To that end, the FET 21 is rendered conductive whenever a channel change is effected. Whenever FET 21 is conductive, a relatively low impedance path is present across the high valued resistor 15. That combination effectively provides low impedance input circuit for the amplifier 17. Therefore, whenever the selective switch 9 is moved to a different position, FET 21 is rendered momentarily conductive and a relatively low resistance is effectively connected between the capacitor 13 and ground thereby providing, momentarily, a relatively small RC time constant coupling circuit. The capacitor 13 will then rapidly charge or discharge to the DC component value of the new input signal presented thereto, thereby substantially reducing the response time of the AC amplifier 17. Following a predetermined delay after the selector switch 9 contacts a new input terminal, the FET 21 will again become nonconductive, and the effective resistance presented across the input terminals of the AC amplifier 17 will again be the high valued resistor 15 which will assure maximum fidelity in coupling the AC component of the input signal to the AC amplifier 17.

It should be noted that only four input terminals are shown in the present example for the sake of clarity. In practive, however, many more input channels may be included. Also, the purpose of the switching means 39 is to provide a connection between the resistor 41 and the common point 25 for every channel change of the selector switch 9. The form of the switching means 39 shown in the figure represents one method of accomplishing the net result although many other methods may be used. The selector switch 9 and the switching means 39 are shown in the second of four different possible positions. It will be assumed that the ganged switches have been in that position for a period of time and that the capacitor 13 has been charged to the steady state value of the DC component present in the input signal applied to the input terminal 3. That being the case, only the AC component of the input signal will pass the capacitor 13 and appear across the resistor 15, thereby being applied to the AC amplifier 17. When the switching means 39 is centrally positioned on one terminal, there is no current path between the battery 29 and the capacitor 37. Therefore, the capacitor 37 will have no charge accumulated thereon. The cathode terminal of the diode 23 is held near the negative potential applied at the source terminal 31 and that potential is applied to the gate terminal of the FET 21, thereby rendering the FET 21 nonconductive.

When it is desired to amplify the signal presented between the input terminal 5 and the reference terminal 11, the selector switch 9 is moved to its third position. Since the second switching means 39 is coupled to the first switching means or selector switch 9, the switching means 39 is concurrently moved toward its third position. The switching means 39, in moving from its second position to its third position, provides a momentary short circuit across those positions due to its "make before break" nature. That momentary short circuit allows a charging current to flow from the positive source terminal 27 through the resistor 41, the switching means 39 and the resistor 35, back to the negative source terminal 31. The charging current following through resistor 35 causes a potential drop to appear across that resistor, raising the potential at the common point 25 with respect to the common ground reference. A charge representative of that potential is stored by the capacitor 37 which acts as a time delay means as hereinafter explained. The potential at point 25 back-biases the diode 23 thereby causing the gate terminal of the FET 21 to be at or slightly above the ground reference potential. That potential at the gate terminal of the FET 21 causes the FET 21 to become conductive which, in turn, causes the resistance across the source and drain terminals of the FET 21 to drop to a very low value. When that low value resistance is combined with the resistor 15 and the capacitor 13, the coupling circuit for the AC amplifier 17 adopts a smaller RC time constant, thereby decreasing the response time of amplifier 17 to the newly applied input signal. While the FET 21 is conducting, the effective resistance from the capacitor 13 to ground is relatively small. The capacitor 13 will therefore rapidly charge or discharge (depending on the relative value of the DC component of the newly applied signal with respect to that of the signal previously applied) to the value of the DC component of the newly applied input signal. When the switching means 39 "breaks" contact with its second terminal as it continues forward, while remaining engaged with, it's third terminal, no further charging current flows through the resistor 35. The capacitor 37 will then discharge through the resistor 35, thereby lowering the potential at point 25 at a predetermined rate, providing the time delay hereinbefore mentioned. When the voltage at the point 25 reaches a value equal to the pinch-off voltage of the FET 21, the drain current of the FET 21 goes to zero and the FET 21 assumes a nonconductive state. The charging time of the capacitor 37 depends on the time that the second and third terminals of the switching means 39 are shorted and also upon the time constant of the resistor 41 in association with the capacitor 37. The discharging time of the capacitor 37 depends on the time constant of the capacitor 37 in association with the resistor 35. After the charging and discharging of the capacitor 37 the circuit will be ready to perform another operational cycle when the selector switch 9 is switched to another input terminal or channel. Since the combined time constant of the capacitor 37 with the resistor 41, and of the capacitor 37 with the resistor 35, is substantially shorter than the time constant of the capacitor 13 and the resistor 15, a fast amplifier response time is possible without sacrificing input signal transfer fidelity.

Thus, there has been provided an improved control circuit which is simple in design and requires a minimum of component parts and which, when used in combination with a multiple channel sensing circuit where one of a plurality of input signals is selectively applied through a coupling means to an AC amplifier, allows both high fidelity AC component transfer from the input channel to the AC amplifier, and also rapid response time of the AC amplifier.

The embodiments of the invention in which an exclusive property or privilege is claimed are defined as follows:

1. In a circuit including a plurality of input signal channels, each of said input channels being arranged to have an input signal, referenced to a common terminal, applied thereto, and wherein a first switching means is selectively actuable to change channels thereby selectively to connect one of said input signal channels to a first terminal of a coupling means, said input signals generally including an AC component and a DC component, said coupling means comprising a DC blocking means and a first impedance means serially connected between said first and a second terminal, respectively, of said coupling means, said second terminal of said coupling means being connected to said common terminal, and wherein an amplifier means has an input means thereof connected across said first impedance means for amplifying only said AC component of said connected input signal, said coupling means being effective to block said DC component following a characteristic response time occurring after each selective actuation of said first switching means, the duration of said response time being related to the value of said first impedance means, the improvement comprising;

a second switching means having first and second terminal means, said second switching means being coupled to said first switching means for synchronous operation therewith, said second switching means being operable for providing a momentary connection between said first and second terminal means thereof during each channel change of said first switching means;

first and second source terminals for connection to a source of energy, said first source terminal being connected to said first terminal means of said second switching means;

second impedance means connecting said second terminal means of said second switching means with said second source terminal, an electrical signal being provided during the continuance of each momentary connection between said first and second terminal means of said second switching means, said second impedance means including a storage means for delaying the termination of said electrical signal for a predetermined period of time after the termination of said momentary connection; and a switching device connected across the input means of the amplifier means and responsive to said electrical signal for establishing a relatively lower impedance path in parallel with said first impedance means during the continuance of said electrical signal whereby to substantially reduce said response time of said amplifier means.

2. The invention as set forth in claim 1 wherein said second impedance means comprises a capacitor connected in parallel with a resistor.

3. The invention as set forth in claim 1 wherein said switching device comprises a field effect transistor having a gate terminal and output terminals, said gate terminal being coupled to said second terminal means of said second switching means, and said output terminals being connected across said first impedance means.

4. The invention as set forth in claim 3 wherein said switching device further includes a diode having anode and cathode terminals, said anode terminal being connected to said gate terminal, and said cathode terminal being connected to said second terminal means of said second switching means, said diode for coupling said gate terminal to said second terminal of said switching means.

* * * * *